United States Patent
Takase et al.

(10) Patent No.: US 9,195,094 B2
(45) Date of Patent: Nov. 24, 2015

(54) LIGHT SOURCE APPARATUS AND LIQUID CRYSTAL DISPLAY APPARATUS

(75) Inventors: Motoki Takase, Osaka (JP); Hideo Takemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/113,315

(22) PCT Filed: May 18, 2012

(86) PCT No.: PCT/JP2012/003276
§ 371 (c)(1),
(2), (4) Date: Nov. 1, 2013

(87) PCT Pub. No.: WO2013/001708
PCT Pub. Date: Jan. 3, 2013

(65) Prior Publication Data
US 2014/0104816 A1    Apr. 17, 2014

(30) Foreign Application Priority Data
Jun. 29, 2011   (JP) ................................ 2011-144972

(51) Int. Cl.
*G02F 1/13357* (2006.01)
*G02F 1/1335* (2006.01)
(Continued)

(52) U.S. Cl.
CPC ............ *G02F 1/133611* (2013.01); *F21K 9/50* (2013.01); *F21V 7/22* (2013.01); *F21V 13/04* (2013.01); *G02F 1/133603* (2013.01); *G02F 1/133606* (2013.01)

(58) Field of Classification Search
CPC .......... G02F 1/133603; G02F 1/33605; G02F 1/133606; G02F 1/133611
See application file for complete search history.

(56) References Cited

U.S. PATENT DOCUMENTS

| 2005/0133808 A1 | 6/2005 | Uraya et al. |
| 2007/0030694 A1 | 2/2007 | Lim |

(Continued)

FOREIGN PATENT DOCUMENTS

| CN | 1912712 A | 2/2007 |
| JP | 2005-210042 A | 8/2005 |

(Continued)

OTHER PUBLICATIONS

Japanese Office Action dated Jan. 16, 2015 for related application JP 2011-144972 with partial English translation.

*Primary Examiner* — Julie Bannan
(74) *Attorney, Agent, or Firm* — Birch, Stewart, Kolasch & Birch, LLP

(57) ABSTRACT

Unevenness in brightness of a plane light source is controlled to improve a display quality of a plane light source. An LED module comprising one or a plurality of light source sections with a high brightness peak value and a large light and dark contrast difference, and an LED module comprising one or a plurality of light source sections with a low brightness peak value and a small light and dark contrast difference, are alternately arranged. The one or the plurality of light source sections comprise a white resist arranged on a substrate region around LED, as a reflection material. The light source section with a large brightness peak value and a large light and dark contrast difference, and the light source with a low brightness peak value and a small light and dark contrast difference, are formed by the difference in a reflection rate of the white resist.

13 Claims, 10 Drawing Sheets

(51) Int. Cl.
*F21K 99/00* (2010.01)
*F21V 7/22* (2006.01)
*F21V 13/04* (2006.01)

(56) References Cited

U.S. PATENT DOCUMENTS

| | | | |
|---|---|---|---|
| 2008/0266852 A1* | 10/2008 | Valerio et al. | 362/240 |
| 2008/0285268 A1 | 11/2008 | Oku et al. | |
| 2010/0020266 A1 | 1/2010 | Hadlich et al. | |
| 2011/0013393 A1 | 1/2011 | Ishio et al. | |
| 2011/0044027 A1* | 2/2011 | Chen | 362/97.1 |
| 2011/0096265 A1* | 4/2011 | Murakoshi et al. | 349/64 |
| 2012/0086875 A1* | 4/2012 | Yokota | 348/790 |
| 2013/0100648 A1* | 4/2013 | Nozawa | 362/97.2 |

FOREIGN PATENT DOCUMENTS

| | | |
|---|---|---|
| JP | 2006-133708 A | 5/2006 |
| JP | 2007-48740 A | 2/2007 |
| JP | 2008-250174 A | 10/2008 |
| JP | 2009-4198 A | 1/2009 |
| JP | 2010-015918 A | 1/2010 |
| JP | 2010-15918 A | 1/2010 |
| JP | 2010-033020 A | 2/2010 |
| JP | 2011-40376 A | 2/2011 |

* cited by examiner

LIGHT SOURCE APPARATUS AND LIQUID CRYSTAL DISPLAY APPARATUS

TECHNICAL FIELD

The present invention relates to a light source apparatus, in which a plurality of LED modules and the like equipped with a plurality of light emitting diodes (LED) as a light source, are used and also relates to a liquid crystal display apparatus in which the light source apparatus is used as a back light.

BACKGROUND ART

Conventional liquid crystal display devices of this type have a transmissive liquid crystal panel, and a backlight is used in the back of the transmissive liquid crystal panel. For the light source apparatus used as a backlight, CCFL (Cold Cathode Fluorescent Lamp) has conventionally been a main stream. However, with recent progress in LED technology, use of the LED as a light source is regarded as promising instead of using the CCFL.

In a direct LED backlight of Patent Document 1, a method is used for controlling streaked and uneven brightness due to the overlapping of shadows created by pillars and adhesive resin of optical lenses blocking light from a light emitting element. However, optical diffusing lenses used therein are all the same.

FIG. 11 is a longitudinal cross sectional view showing a configuration example of an essential part of a conventional light emitting module, on which a light emitting element disclosed in Patent document 1 is mounted. FIG. 12 is a plane view showing an arrangement example of optical lenses in a plane emitting unit on which a plurality of light emitting element modules of FIG. 11 are mounted.

As shown in FIG. 11, in a light emitting element module 100, a plurality of light emitting element parts 102 are mounted on a substrate 101 as light emitting elements, the light emitting element parts 102 being equipped with LEDs and the light emitting element parts 102 being arranged either in one column or in a plurality of columns.

In the substrate 101, wiring is provided on a base material 101a formed by impregnating, for example, a resin (epoxy resin, cyanate resin and the like) into woven or non-woven, glass fiber, organic fiber or the like. White insulation material (white resist and the like) 101b is formed on the uppermost surface of the substrate 101 in such a manner to cover a region except for a land part in the wiring. Covering the uppermost surface of the substrate 101 with the white insulation material 101b increases reflection rate of light from the light emission elements and increases light irradiation amount to a display area, in addition to protecting the wiring. Note that ordinary solder resist can be used if a reflection sheet is provided separately on the surface of the substrate.

In a light emitting element part 102, one or a plurality of LED chips (not shown) are mounted on a part substrate 102a such as ceramic, and the LED chips are electrically connected to the part substrate 102a with wires (not shown). Thus, the LED chips and wires are formed by being sealed by a sealing resin 102b. For the seal resin 102b, transparent resin such as silicon is used, and fluorescent materials are added as needs arise.

The substrate 101 has an opening 101d which is not covered with the insulating materials 101b. In the opening 101d, an optical lens 103 and the base material 101a of the substrate 101 are fixed with adhesive resin 104.

The size of the opening 101d is the same as, or slightly greater than, that of a bottom surface of a pillar 103a of the optical lens 103. As such, providing the opening 101d the size of which is the same as or slightly greater than the size of the bottom surface of the pillar 103a facilitates the positioning of the adhesive resin 104, thus facilitating the control of resin amount. If the amount of the adhesive resin 104 is too much, then the adhesive resin 104 will rise up to the bottom surface of the lens section 103b of the optical lens 103, or will spread to the surface of substrate 101 beyond the opening 101d. As a result, transmitted light may be blocked or absorbed at the bottom surface of the lens section 103b or the pillar 103a, which may influence the diffusion of light from the light emitting element.

At the center of the optical lens 103, a recess 103c is formed for partially housing the light emitting element part 102 from the bottom. The light emitting element part 102 is not sealed and has a layer of air between the light emitting element part 102 and the recess 103C, which provides favorable heat radiation of the light emitting element part 102.

In addition, in a conventional plane light emission unit 110 as shown in FIG. 12, pillars 103a of each of optical lenses 103 and adhesive resins 104 adjacent to each other are arranged to commonly prevent a straight line L1 in a longitudinal direction and a straight line L2 in a transverse direction, where the lines connect the centers of the light emitting element parts 102 adjacent to each other. As a result, shadows created by pillars 103a of the optical lenses 103 and adhesive resins 104 blocking light from a light emitting element will not overlap with each other, thereby controlling the occurrence of streaked and uneven brightness.

PRIOR ART DOCUMENTS

Patent Documents

Patent Document 1: Japanese Laid-Open Publication No. 2011-40376

SUMMARY OF THE INVENTION

Problems to be Solved by the Invention

In the above conventional plane light emitting unit 110 disclosed in Patent Document 1, when the light diffusing lenses 103 are arranged in a matrix and in a longitudinal and transverse array as shown in FIG. 12, the spread of individual light of many of the light emitting element parts 102 link with light of an adjacent light diffusing lens 103. Therefore, uneven emission of light is likely to occur, which is a certain pattern of longitudinal streaks, transverse streaks and oblique streaks as a whole backlight. In particular, uneven emission of streaks occurring throughout an entire screen are obvious to human eyes, which is one of the reasons that reduces a display quality.

Unevenness of the same type occurring continuously at a proximal position is more visible to human eyes than unevenness of the same type occurring at a location farther than the proximal position, even if the two types of unevenness have the same brightness difference.

In addition, when the distance between a light emitting element and a light diffusing sheet is narrowed down to performance limitation or when the pitch distance of light emitting elements mounted in a planar manner is widened to performance limitation, there arises a problem with a conventional configuration with a single light distribution property, of insufficient spreading of light from the center of the light emitting element to the peripheral portion depending on a deviation in properties due to variation on production of light emitting element modules. Thus, the brightness is relatively decreased at the middle point between the light emitting elements in a plane view, and the brightness immediately above the light emitting elements is relatively increased to generate lattice like unevenness, which affects the display quality.

The present invention is intended to solve the conventional problems described above. It is an objective of the present invention to provide: a light source apparatus capable of controlling brightness unevenness of a plane light source to increase display quality of the plane light source; and a liquid crystal display apparatus with the light source apparatus used therein.

Means for Solving the Problem

A light source apparatus according to the present invention comprises a plurality of light emitting element modules provided therein, in which one or a plurality of light emitting elements are mounted on a substrate, for emitting light planarly, where a light source section causing first unevenness and a light source section causing second unevenness are alternately arranged, so that the first unevenness and the second unevenness are relieved with each other, thereby achieving the objective described above.

Preferably, in the light source apparatus according to the present invention, alight source section causing lattice like unevenness by a light part and a light source section causing oblique like unevenness by a light part are alternately arranged for each row or each column when a plurality of light source sections are arranged in a matrix in a row direction and a column direction in a plane view.

A light source apparatus according to the present invention comprises a plurality of light emitting element modules provided therein, in which one or a plurality of light emitting elements are mounted on a substrate, for emitting light planarly, the light source apparatus further comprising a light source section with a narrow light distribution property and a light source section with a broad light distribution property being alternately arranged for each row or each column when a plurality of the light source sections are arranged in a matrix in a row direction and a column direction in a plane view, thereby achieving the objective described above.

Preferably, in a light source apparatus according to the present invention, a light source section with a large light and dark contrast difference and a light source section with a small light and dark contrast difference are alternately arranged in the light emitting element module for each row or each column when a plurality of the light source sections are arranged in a matrix in a row direction and a column direction in a plane view.

Still preferably, in a light source apparatus according to the present invention, a light emitting element module comprising one or a plurality of light source sections with a large light and dark contrast difference, and a light emitting element module comprising one or a plurality of light source sections with a small light and dark contrast difference, are alternately arranged.

Still preferably, in the light emitting element module in the light source apparatus according to the present invention, a light source section with a large light and dark contrast difference and a light source section with a small light and dark contrast difference are alternately arranged.

Still preferably, in the light source apparatus according to the present invention, the light source section comprises a reflecting material provided on a substrate region around the light emitting element, in addition to the light emitting element; and the light source section with the large light and dark contrast difference and the light source section with the small light and dark contrast difference are formed by the difference in a reflection rate of the reflecting material.

Still preferably, in the light source apparatus according to the present invention, a lens is mounted for each light emitting element, and the substrate region around the light emitting element is a substrate region immediately below the lens.

Still preferably, in the light source apparatus according to the present invention, a light source section with a narrow light distribution angle and a light source section with a broad light distribution angle are alternately arranged when a plurality of the light source sections are arranged in a matrix in a row direction and a column direction in a plane view.

Still preferably, in the light source apparatus according to the present invention, the light emitting element module comprising the one or the plurality of light source sections with the narrow light distribution angle, and the light emitting element module comprising the one or the plurality of light source sections with the broad light distribution angle are alternately arranged.

Still preferably, in the light source apparatus according to the present invention, the light source section with the narrow light distribution angle and the light source section with the broad light distribution angle are alternately arranged in the light emitting element module.

Still preferably, in the light source apparatus according to the present invention, the light source section comprises the light emitting element and the lens mounted for each light emitting element; and the light source section with the narrow light distribution angle and the light source section with the broad light distribution angle are formed by the difference in at least any of a length of a plurality of principal pillars of the lens, a thickness of the lens and a shape of the lens.

Still preferably, in the light source apparatus according to the present invention, the light source section comprises the light emitting element; and the light source section with the narrow light distribution angle and the light source section with the broad light distribution angle are formed by the difference in a height of the one or the plurality of light emitting sections of the light emitting element.

Still preferably, in the light source apparatus according to the present invention, the light source section comprises the light emitting element; and the light source section with the narrow light distribution angle and the light source section with the broad light distribution angle are formed by the difference in a shape of a sealing section through which light from the light emitting element is emitted.

A liquid crystal display apparatus according to the present invention comprises the light source apparatus according to the present invention provided on a back surface side of a liquid crystal panel, to be used as a backlight, thereby achieving the objective described above.

With the above structure, the operation of the present invention will be described.

According to the present invention, in a light source apparatus in which a plurality of light emitting element modules having one or a plurality of light emitting elements mounted on a substrate are provided for planar light irradiation, when a plurality of light source sections are arranged in a matrix and in row and column directions in a plane view, a light source section with a narrow light distribution property and a light source section with a broad light distribution property are alternately arranged for each row or each column.

Accordingly, the light source section with a narrow light distribution property and the light source section with a broad light distribution property are alternately arranged, Thus, a light source section having large light emission brightness on an optical axis passing through a light emitting element and small light emission brightness in a peripheral part away from the optical axis, is combined with a light source section having small light emission brightness on the optical axis passing through the light emitting element than the light emission brightness on the optical axis at the first light source section, and having large light emission brightness in a peripheral part away from the optical axis than light emission brightness at the peripheral part away from the optical axis of the first light source section, thereby relieving the decrease in emission brightness between the light source sections. As a result, the difference in brightness is relieved immediately above the light source section and between the light source sections. Thereby, it becomes possible to control the brightness unevenness of the plane light source and increase a display quality of the plane light source.

In addition, since the difference in brightness is relieved immediately above the light source section and between the light source sections and the unevenness in brightness is controlled on a screen, a pitch between the light emitting elements can be widened, and as a result, the number of light source sections, including light emitting elements, are reduced.

Effects of the Invention

From the foregoing, according to the present invention, a light source section having large light emission brightness on an optical axis passing through a light emitting element and small light emission brightness in a peripheral part away from the optical axis, is combined with a light source section having small light emission brightness on the optical axis passing through the light emitting element than the light emission brightness on the optical axis at the first light source section, and having large light emission brightness in a peripheral part away from the optical axis than light emission brightness at the peripheral part away from the optical axis of the first light source section, thereby relieving the decrease in emission brightness between the light source sections. As a result, the difference in brightness is relieved immediately above the light source section and between the light source sections, and it becomes possible to control unevenness in brightness on a screen visually sensed by humans. As a result, it becomes possible to increase a display quality of the plane light source.

As such, since the difference in brightness is relieved immediately above the light source section and between the light source sections and the unevenness in brightness is controlled on a screen, the pitch between the light emitting elements can be widened, and as a result, the numbers of light source sections can be reduced.

Figure 1:
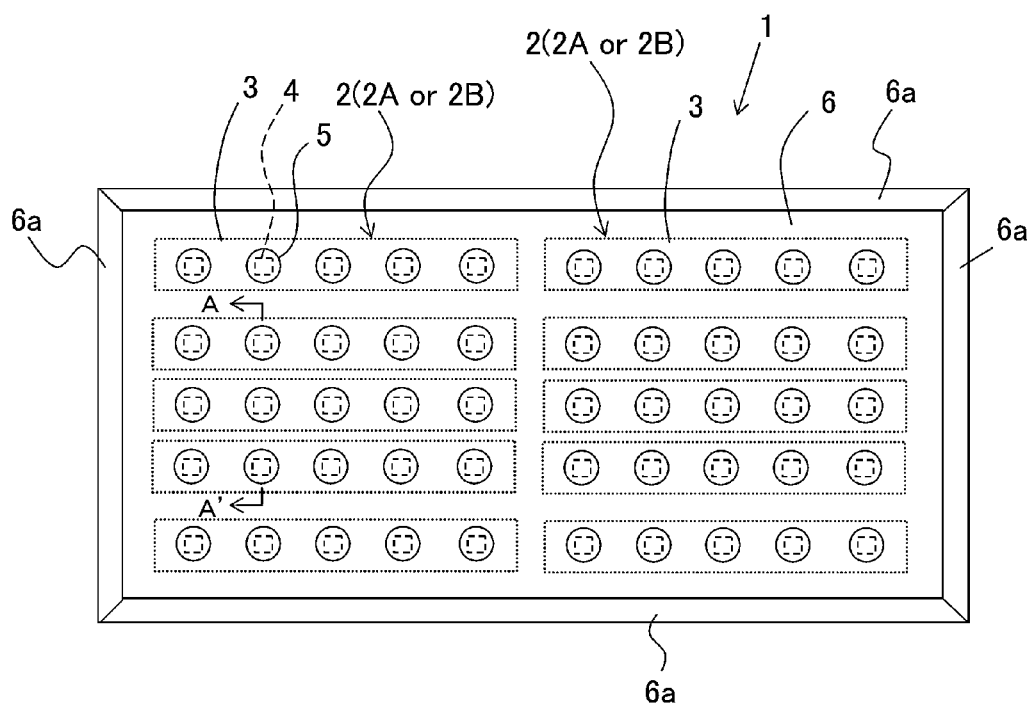
FIG. 1 is a plane view schematically showing an example of an LED module arrangement of an LED light source apparatus according to Embodiment 1 of the present invention.

REFERENCE SIGNS LIST 1, 11, 12 LED light source apparatus (light source apparatus)
2 LED module (light emitting element module)
2A LED module in which brightness is set to be high and a light and dark contrast difference is set to be large
2B LED module in which brightness is set to be low and a light and dark contrast difference is set to be small
2C, 2F LED module in which a light distribution angle is set to be narrow
2D, 2E LED module in which a light distribution angle is set to be broad
3 printed circuit board
4, 4a, 4b LED (light emitting element)
5, 5C, 5D light diffusing lens (lens)
5a, 5a1, 5a2 pillar
5b diffusing pattern
6 reflection sheet
6a inclined face 6A white resist with a high reflection rate
6B white resist with a low reflection rate
20, 20C, 20E liquid crystal display apparatus
21 optical sheet
22 optical transmissive liquid crystal panel
7, 7A, 8B dark portion
8 light portion
9 chassis (housing)

EMBODIMENTS FOR CARRYING OUT THE INVENTION

Hereinafter, as Embodiments 1 and 2 of a light source apparatus according to the present invention, a case where each LED light source apparatus is applied to a transmissive liquid crystal panel will be described in detail with reference to drawings. Note that the thicknesses, lengths and the like of constituent elements in each of the figures are not limited to those of the illustrated structures in terms of the provided figures.

Embodiment 1

FIG. 1 is a plane view schematically showing an example of an LED module arrangement of an LED light source apparatus according to Embodiment 1 of the present invention.

In FIG. 1, an LED light source apparatus 1 according to Embodiment 1 of the present invention is constituted of a plurality of LED modules 2. While multiple arrays are usually provided, five rows of rectangular LED modules 2 are arranged herein for convenience sake in the transverse direction, each row comprising two LED modules 2 side by side. Among the five rows of the rectangular LED modules 2 extending in the transverse direction, although not clearly shown, the rectangular LED modules 2 in the three center rows are arranged with a dense arrangement pitch in the longitudinal direction so that the LEDs 4 in the center are arranged a little closer to each other to increase the brightness at the center portion of the screen.

Respective LED modules 2 each have a printed circuit board 3 and a plurality of (five, herein) LEDs 4 in series mounted on the printed circuit board 3. Each row of LED modules 2 is constituted of a plurality (two on the left and right, herein) of LED modules 2, and the two LED modules 2 on the left and right are arranged to be close to each other so that the arrangement pitch of LEDs 4 becomes equal. Thereby, the plurality of LEDs 4 are arranged at regular intervals in a matrix in the longitudinal and transverse directions. A light diffusing lens 5 covering each LED 4 for diffusing light from the LED 4 is attached to each LED 4 from the above. In this case, the light diffusing lens 5 is implemented on the printed circuit board 3, with three pillars 5a underneath and the light diffusing lens 5 covering the LED 4. The three pillars 5a of the light diffusing lens 5 abuts the printed circuit board 3 and is fixed thereto with adhesive (not shown) or the like. On the bottom surface of the light diffusing lens 5, a diffusion pattern 5b (quadrangular pyramid, herein) of FIG. 2 is formed, which is to be described later.

A plurality of holes are opened at predetermined arrangement positions in a reflection sheet 6, through which the light diffusing lens 5 mounted on the LED 4 penetrate together with LED 4, by the number of LEDs 4. With the light diffusing lenses 5, together with the LEDs 4 mounted on the LED module 2, penetrating the plurality of through-holes in the reflecting sheet 6 from the back side of the holes of the reflecting sheet 6, a plurality of the printed circuit boards 3 and reflection sheet 6 are fixed to a chassis (not shown) therebelow. Light from a plurality of LEDs 4 passes through respective light diffusing lenses 5 and the light is reflected by the reflecting sheet 6 and is emitted to the front. Thereby, the LED light source apparatus functions as a diffused plane light source. A screen periphery section (frame section around a screen) of the reflecting sheets 6 is such that four long, longitudinal and transverse faces are each constituted of an inclined surface 6a so as to open to the front.

The featured constitution of Embodiment 1 is such that, when a plurality of light sources are arranged in a matrix in a row direction and a column direction in a plane view, a light source section with a high brightness peak value and a large light and dark contrast difference, and a light source section with a low brightness peak value and a small light and dark contrast difference, are alternately arranged for each row or each column, as will be detailed later. That is, as will be described in detail later, the featured constitution of Embodiment 1 is such that a light emitting element module 2A with light emitted by a light source section with a high brightness peak value and a large light and dark contrast difference, and light emitting element module 2B with light emitted by a light source section with a low brightness peak value and a small light and dark contrast difference, are alternately arranged to decrease unevenness in brightness. In this regard, although a detailed description will be provided later, in addition to the LED 4 and the light diffusing lens 5, the light source section comprises white resists 6A and 6B in FIG. 2 to be described later, which are arranged on a substrate region (substrate region around the LED immediately below the light diffusing lens 5 and which function as a reflecting material. The light source section with a high brightness peak value and a large light and dark contrast difference (narrow light distribution characteristic), and the light source section with a low brightness peak value and a small light and dark contrast difference (wide light distribution characteristic) are formed by the difference in the reflection rate of the white resists 6A and 6B.

Figure 2:
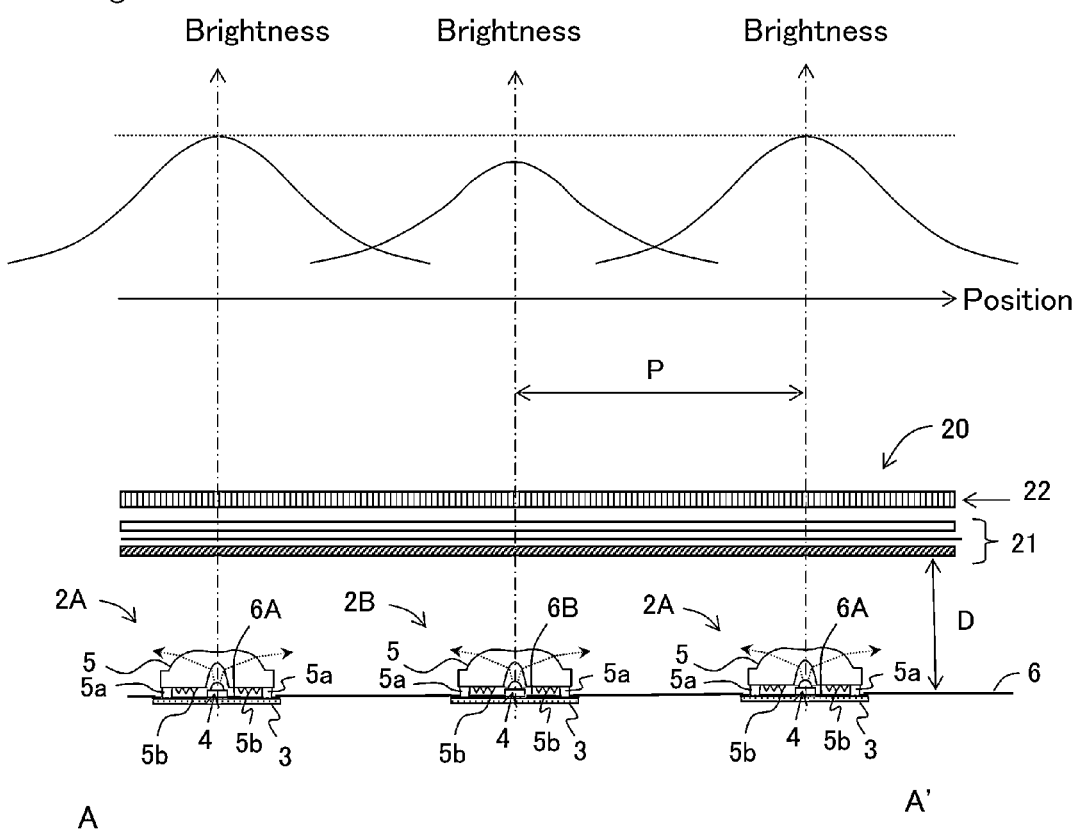
FIG. 2 is a longitudinal cross sectional view of a section AA' schematically showing a configuration example of an essential part of a liquid crystal display apparatus with the LED light source apparatus in FIG. 1 incorporated therein and is also a figure showing brightness according to positions corresponding to the section AA'.

FIG. 2 is a longitudinal cross sectional view of a section AA' schematically showing a configuration example of an essential part of a liquid crystal display apparatus with the LED light source apparatus 1 in FIG. 1 incorporated therein and is also a figure showing brightness according to positions corresponding to the section AA'. Herein, the Figure shows three LED modules 2 in a width direction (AA' direction).

In FIG. 2, a liquid crystal display apparatus 20 of Embodiment 1 comprises: an LED light source apparatus 1 of Embodiment 1 functioning as an LED backlight, in which a plurality of LED modules 2 are arranged for plane emission of light, each LED module 2 comprising a plurality of LEDs 4 arranged on each printed circuit board 3 and the above-mentioned light diffusing lens 5 provided to cover each LED 4; an optical sheet 21 provided apart from a reflecting sheet 6 by a distance D above the LED light source apparatus 1, the optical sheet 21 comprising a light diffusing sheet, a prism sheet and the like for controlling light unevenness; and a light transmissive liquid crystal panel 22 of a liquid crystal display screen provided on the optical sheet 21, which is capable of displaying an liquid crystal image based on display signals. The LED light source apparatus 1 is provided on the back side of the light transmissive liquid crystal panel 22 to be used as a backlight.

Since the holes through which the light diffusing lenses 5 pass are opened in the reflection sheet 6, the reflection sheet 6 is not provided on the circular printed circuit board 3 immediately below the light diffusing lens 5. For increasing utilization efficiency of light, a white resist 6A, 6B (paint) is applied on the circular printed circuit board 3 immediately below the light diffusing lens 5. The reflection rate of the white resist 6A, 6B is, for example, 81 to 85%. The white resist 6A, 6B is also applied for the purpose of protecting wiring at the manufacturing of the printed circuit board 3. The white resist 6A, 6B is applied to portions other than a wiring land section that requires electrical connection or a portion at which the pillar 5a of the light diffusing lens 5 abuts the base material. Since the circular white resist 6A, 6B, on the printed circuit board 3 immediately below the light diffusing lens 5, is positioned immediately below the light diffusing lens 5, it is likely that the white resist 6A, 6B affects the brightness above the light diffusion lens 5 directly.

Of the light once emitted from the light source section, a part of the light, which is reflected by the optical sheet 21, such as a light diffusing sheet, to return to the light source section, and reflected by the white resist 6 applied to the surface of the base material through the light diffusing lens, and again enters the light diffusing lens 5, has a tendency to converge at the center of the light diffusing lens 5. Therefore, depending on the degree of the reflection rate of the white resist 6A, 6B, the light distribution property (diffusion of light/distribution of brightness) of light emitted from the light source varies. For example, supposing that the reflection rate of the white resist 6A is 85% and the reflection rate of the white resist 6B is 81%, the brightness above the center of the light diffusing lens 5 immediately above the white resist 6A becomes increasingly high compared to the case with the white resist 6B. In this case, the portion around the center of the light diffusing lens 5 looks brighter due to the difference in brightness. In addition, the brightness above the center of the light diffusing lens 5 immediately above the white resist 6B is lower compared to the case of the white resist 6A. In this case, the brightness becomes dark overall, but the difference in luminance becomes less. On the other hand, with regard to the brightness at a location apart from the center of light diffusing lens 5, the brightness with the white resist 63 becomes larger than the brightness with the white resist 6A. That is, when the reflection rate of the white resist is increased, the brightness becomes high at the center of the light diffusing lens, but the difference in brightness becomes large with the periphery around the center of the light diffusing lens. Accordingly, this is a light source having a large light and dark contrast as a single light source. Conversely, when the reflection rate of the white resist is reduced, the brightness becomes low at the center of the light diffusing lens, but the difference in brightness becomes small with the periphery around the center of the light diffusing lens. Accordingly, this is a light source having a small light and dark contrast as a single light source.

While the reflection rate of the white resist 6A, 6B is changed in units of printed circuit board 3, an LED module 2A in which the brightness is set to be high by the reflection rate of the white resist 6A (for example, 85% herein; i.e., white resist 6A with a high reflection rate), and an LED module 2B in which the brightness is set to be low by the reflection rate of the white resist 6B (for example, 81% herein, i.e., white resist 6B with a low reflection rate) are alternately arranged in units of substrate section. If only the LED modules 2A, in which brightness is set to be high and a light and dark contrast difference is set to be large, are arranged, the peak of brightness will be present at a arrangement pitch P, e.g., 50 mm, of the LED 4 and light diffusing lens 5. However, if the LED module 2B, in which brightness is set to be low and a light and dark contrast difference is set to be small, is arranged between the LED modules 2A in which brightness is set to be high and a light and dark contrast difference is set to be large, then the brightness peak will be present at 100 mm, which is 2 times greater than 50 mm, as the arrangement pitch P. Furthermore, the brightness peak positions are separated from each other, and the LED modules 2B in which brightness is set to be low and a light and dark contrast difference is set to be small, relieves the difference in the portions with lowered brightness between adjacent light diffusing lenses 5 to control the unevenness in brightness.

The optical sheet 21 functioning as a light diffusing means is arranged at an upper portion of the light source section consisting of: one or a plurality of LEDs 4 arranged two-dimensionally on a plane surface; light diffusing lenses 5 covering the LEDs 4; and white resists 6A or 6B immediately below the light diffusing lenses 5. Light from one or a plurality of light source sections is allowed to pass through the optical sheet 21, and the light from the one or the plurality of light source sections is further spread on a plane by an effect such as diffusion, multiple reflection and retroreflection of light by the optical sheet 21. By the overlapping of the spread pattern of the light thus obtained, plane light emission with a flat brightness characteristic is obtained.

Hereinafter, the principal of controlling unevenness in brightness according to Embodiment 1 will be further described in a specific manner.

Figure 3:
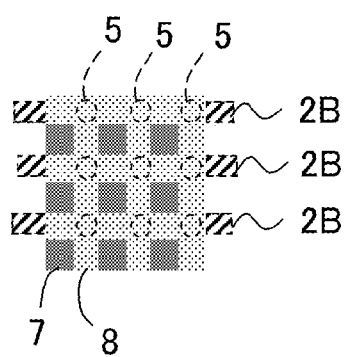
FIG. 3 is a plane view schematically showing positions of light diffusing lenses and light and dark portions of brightness, in the case of providing only an LED module in which brightness is set to be low by a reflection rate of a white resist.

FIG. 3 is a plane view schematically showing positions of light diffusing lenses 5 and light and dark portions of brightness, in the case of providing only an LED module 2B in which brightness is set to be low by a reflection rate of a white resist 6B.

As shown in FIG. 3, in the case of the LED module 2B in which the brightness peak value is low and the light and dark contrast difference is small, since the difference in brightness is small between the adjacent light diffusing lenses 5 in the up and down direction and the left and right direction in a plane view, the unevenness in brightness is small. However, in a space in a diagonal direction between the light diffusing lenses 5 adjacent to each other, the brightness difference occurs due to the separation of the brightness peak positions, resulting in forming a dark portion 7. Because of this, unevenness in brightness occurs due to the dark portion 7 in the diagonal direction between the light diffusing lenses 5. Conversely, lattice unevenness occurs due to a light portion 8.

Figure 4:
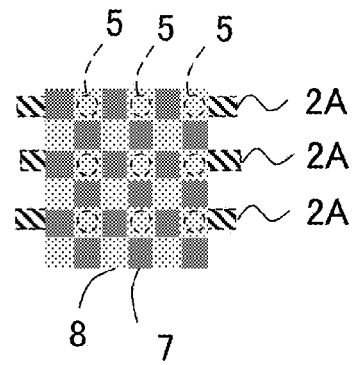
FIG. 4 is a plane view schematically showing positions of light diffusing lenses and light and dark portions of brightness, in the case of providing only an LED module in which brightness is set to be high by a reflection rate of a white resist.

FIG. 4 is a plane view schematically showing positions of light diffusing lenses 5 and light and dark portions of brightness, in the case of providing only an LED module 2A in which brightness is set to be high by a reflection rate of a white resist 6A.

As shown in FIG. 4, in the case of the LED module 2A in which the brightness peak value is high and the light and dark contrast difference is large, since the difference in brightness is large between the adjacent light diffusing lenses 5 in the up and down direction and the left and right direction in a plane view, the unevenness in brightness is large, which results in forming a dark portion 7. However, in a space in the diagonal direction between the light diffusing lenses 5 adjacent to each other, the brightness difference is small as the brightness peak positions are separated from each other. Furthermore, the lights overlap with each other, thus not causing a dark portion 7. Because of this, the unevenness in brightness occurs due to the light portion 8 in the diagonal direction between the light diffusing lenses 5. Conversely, lattice unevenness occurs due to the dark portion 7.

Figure 5:
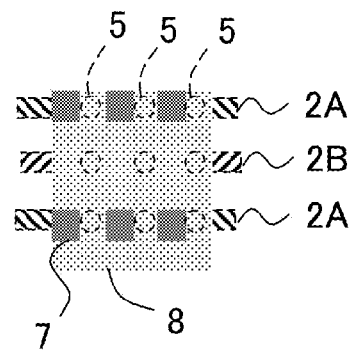
FIG. 5 is a plane view schematically showing positions of light diffusing lenses and light and dark portions of brightness in the case of Embodiment 1 alternately arranging an LED module having a high brightness peak and a larger difference in light and dark contrast, and an LED module having a low brightness peak and a small difference in light and dark contrast, in units of substrate section.

FIG. 5 is a plane view schematically showing positions of light diffusing lenses 5 and light and dark portions of brightness in the case of Embodiment 1 alternately arranging an LED module 2A having a high brightness peak and a large difference in light and dark contrast, and an LED module 2B having a low brightness peak and a small difference in light and dark contrast, in units of substrate.

As shown in FIG. 5, by alternately arranging the LED module 2A in which the peak value of brightness is large and the difference in light and dark contrast is large, and the LED module 2B in which the peak value of brightness is low and the difference in light and dark contrast is small, the dark portion 7 and light portion 8 in FIG. 3 overlap with the light portion 8 and dark portion 7 in FIG. 4, so that the brightness of the dark portion 7 and the brightness of the light portion 8 are averaged, thus greatly controlling the unevenness in brightness to form the light portion 8. In the case of a plurality of light source sections being arranged in a matrix in row and column directions in a plane view, a light source section causing lattice like unevenness due to a light part, and a light source section causing oblique like unevenness due to a light part, are alternately arranged for each row or each column. Specifically, a light source section causing first unevenness and a light source section causing second unevenness are alternately arranged, so that the first unevenness and the second unevenness are compensated with each other to be relieved. The LED module 2B having a plurality of light source sections with a low peak value of brightness and a small difference in light and dark contrast, corresponds to the LED module having a plurality of light source sections in which lattice-like unevenness occurs due to light portions as the first unevenness. Moreover, the LED module 2A having a plurality of light source sections with a high peak value of brightness and a large difference in light and dark contrast, corresponds to the LED module having a plurality of light source sections in which oblique unevenness occurs due to light portions as the second unevenness. In this case, the light source section comprises white resist 6A or 6B provided on the printed circuit board 3 immediately below the light diffusing lens 5, as a reflecting material in addition to the LED 4 and light diffusing lens 5 as light emitting elements. The light source section with a high peak value of brightness and a large difference in light and dark contrast, and a light source section with a low peak value of brightness and a small difference in light and dark contrast, are configured (constituted) by the difference in the reflection rate of white resists 6A, 6B.

Figure 6:
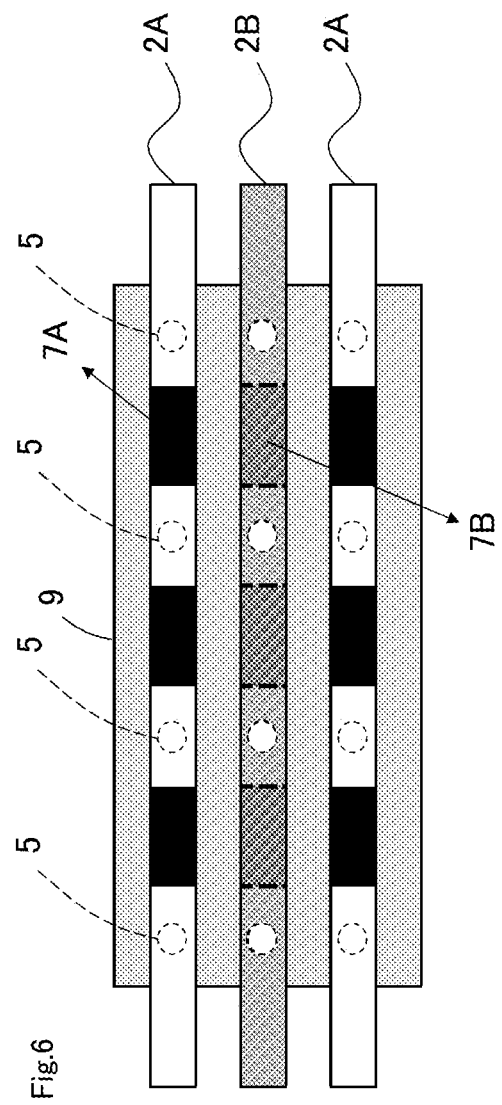
FIG. 6 is a plane view schematically showing an arrangement example of three LED modules in the LED light source apparatus in FIG. 1.

FIG. 6 shows this case. In FIG. 6, the LED modules 2A and LED modules 2B with different degrees of brightness are alternately arranged. Between the LED module 2A and LED module 2B, the reflection rates of the white resist 6A and 6B are defined to be different. In this case, on the same substrate, a dark portion 7A occurs between the light diffusing lenses 5 of the LED module 2A having a high peak value of brightness and a large difference in light and dark contrast, where the dark portion 7A is a portion with a large difference in brightness between light emitting sections and with a great reduction in light. While a dark portion 7B occurs between the light diffusing lenses 5 of the LED module 2B having a low peak value of brightness and a small difference in light and dark contrast, the dark portion 7B is a portion having a small difference in brightness between the light emitting sections and having a low reduction in light. Thus, the unevenness in brightness is not much. Note that these LED module 2A and LED module 2B are fixed to a chassis 9 (housing).

From the foregoing, according to the LED light source apparatus 1 of Embodiment 1, the LED module 2A having a plurality of light source sections with a high peak value of brightness and a large difference in light and dark contrast, and the LED module 23 having a plurality of light source sections with a low peak value of brightness and a small difference in light and dark contrast, are alternately arranged. The one or the plurality of light source sections comprise a white resist 6A, 6B provided on the substrate region around LED 4 (substrate region immediately below the light diffusing lens 5), as a reflecting material. The light source section with a high brightness peak value and a large light and dark contrast difference, and the light source section with a low brightness peak value and a small light and dark contrast difference, are formed by the difference in the reflection rate of the white resists 6A, 6B.

Accordingly, a light source section having large light emission brightness on an optical axis passing through a light emitting element and small light emission brightness in a peripheral part away from the optical axis, is combined with a light source section having small light emission brightness on the optical axis passing through the light emitting element than the light emission brightness on the optical axis at the first light source section, and having large light emission brightness in a peripheral part away from the optical axis than light emission brightness at the peripheral part away from the optical axis of the first light source section, thereby relieving the decrease in emission brightness between the light source sections. As a result, the difference in brightness is relieved immediately above the light source section and between the light source sections. Thereby, the unevenness in brightness can be controlled on a screen visible to human eyes. In detail, the brightness distribution (light and dark contrast) from the light diffusing lenses 5 are intentionally regulated and managed by the difference in the reflection rates of the white resists 6A, 6B, and the light portion 8 and dark portion 7 are compensated with each other, thereby greatly controlling the unevenness in brightness. In addition, according to the liquid crystal display apparatus 20 of Embodiment 1, streaked unevenness in brightness occurring on an entire screen is eliminated, thereby increasing the quality of the plane light source and improving the display quality. Therefore, the unevenness in brightness is controlled in the plane light source and the display quality is improved in the plane light source. Further, since the difference in brightness is relieved immediately above the light source section and between the light source sections and the unevenness in brightness is controlled on a screen, the pitch distance of the LEDs 4 can be widened. As a result, the number of light source sections including the LEDs 4 can be reduced.

In Embodiment 1, the case has been described where the LED module 2A having light source sections with a high peak value of brightness and a large difference in light and dark contrast, and the LED module 2B having light source sections with a low peak value of brightness and a small difference in light and dark contrast, are alternately arranged. However, without being limited to this embodiment, even if a light source section with a high brightness peak value and a large light and dark contrast difference, and a light source section with a low brightness peak value and a small light and dark contrast difference, are alternately arranged for each light emitting element module 2, a working effect is exerted which controls the unevenness of brightness of a plane light source and improves the display quality of the plane light source, similar to the case where the LED module 2A having light source sections with a high peak value of brightness and a large difference in light and dark contrast, and the LED module 2B having light source sections with a low peak value of brightness and a small difference in light and dark contrast, are alternately arranged.

In sum, in the case where a plurality of light source sections are arranged in a matrix in row and column directions, it is sufficient to arrange a light source section with a high brightness peak value and a large light and dark contrast difference, and a light source section with a low brightness peak value and a small light and dark contrast difference, alternately for each row or each column.

In addition, in Embodiment 1, the case has been described where the above-mentioned light source section comprises the white resists 6A, 6B provided on the printed circuit board 3 immediately below the light diffusing lens 5, in addition to the LED 4 functioning as a light emitting element and the light diffusing lens 5 covering the LED 4, and the light source section with a high brightness peak value and a large light and dark contrast difference and the light source section with a low brightness peak value and a small light and dark contrast difference are formed by the difference in the reflection rate of the white resists 6A, 6B. However, without being limited to this embodiment, reflecting sheets with different reflection rates may be provided on the printed circuit board 3 immediately below the light diffusing lens 5, as a reflecting material. In addition, the white resist 6A, 6B with different reflection rates may be defined by the number of applications of white resist, and the material of the white resist may be changed in accordance with reflection rates.

Embodiment 2

In Embodiment 1, the case has been described where when a plurality of light sources are arranged in a matrix in a row direction and a column direction in a plane view, a light source section with a high brightness peak value and a large light and dark contrast difference, and a light source section with a low brightness peak value and a small light and dark contrast difference, are alternately arranged for each row or each column. In Embodiment 2, a case will be described where a light source section with a high brightness peak value and a narrow light distribution angle (light directivity), and a light source section with a low brightness peak value and a broad light distribution angle (light directivity), are alternately arranged.

Specifically, the difference from Embodiment 1 is such that a light source section with a narrow light distribution angle (light directivity) (narrow light distribution characteristic), and a light source section with a broad light distribution angle (light directivity) (broad light distribution characteristic), are used instead of using a light source section with a high brightness peak value and a large light and dark contrast difference, and a light source section with a low brightness peak value and a small light and dark contrast difference. Such a light source section with a narrow light distribution angle (light directivity) and a light source section with a broad light distribution angle (light directivity) are a light source section that causes lattice like unevenness due to a light part as first unevenness in brightness and a light source section that causes oblique like unevenness due to a light part as second unevenness in brightness, similar to the case of the light source section with a high brightness peak value and a large light and dark contrast difference and the light source section with a low brightness peak value and a small light and dark contrast difference in Embodiment 1. In the case where a plurality of light source sections are arranged in a matrix in row and column directions in a plane view, a light source section causing lattice like unevenness due to a light part and a light source section that causes oblique like unevenness due to a light part are alternately arranged for each row or each column, so that the lattice like unevenness as the first unevenness in brightness and the oblique like unevenness as the second unevenness in brightness are compensated with each other to be relieved.

Figure 7:
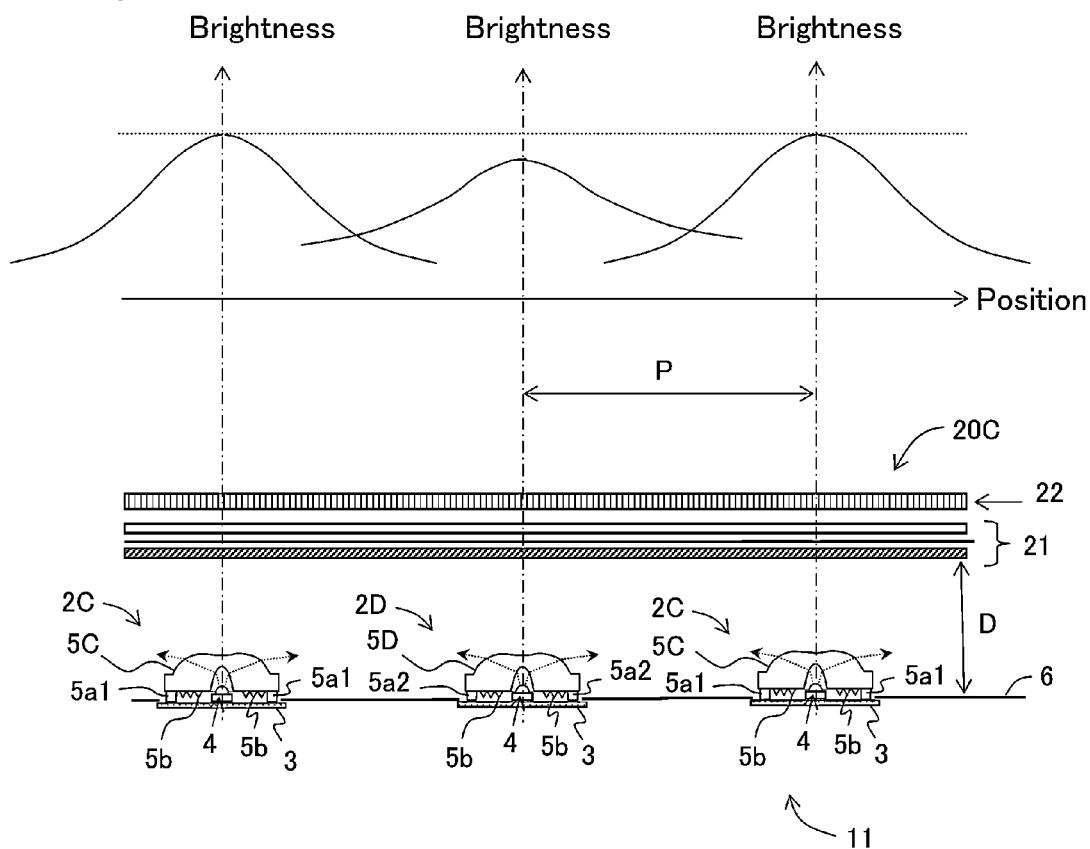
FIG. 7 is a partial longitudinal cross sectional view schematically showing a configuration example of an essential part of a liquid crystal display apparatus having an LED light source apparatus according to Embodiment 2 of the present invention incorporated therein, and is also a figure showing brightness according to positions corresponding to the subject cross-section.
Figure 8:
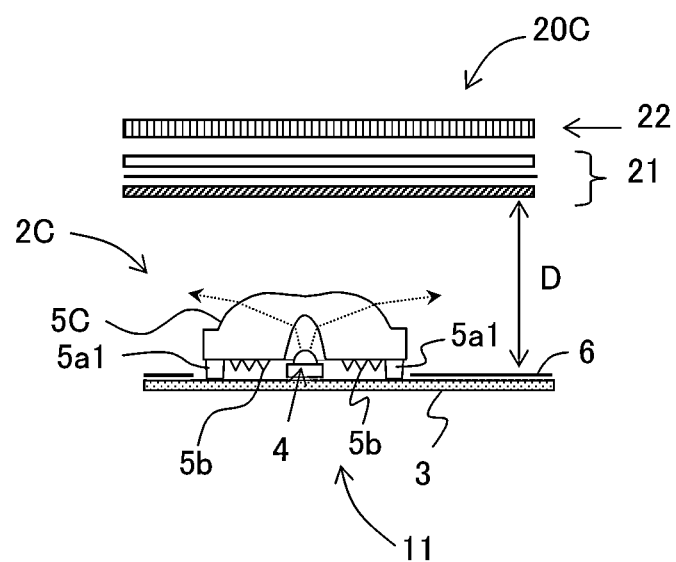
FIG. 8 is a partial longitudinal cross sectional view schematically showing a configuration example of an essential part of a liquid crystal display apparatus, for describing a light source section with a narrow light distribution angle.
Figure 9:
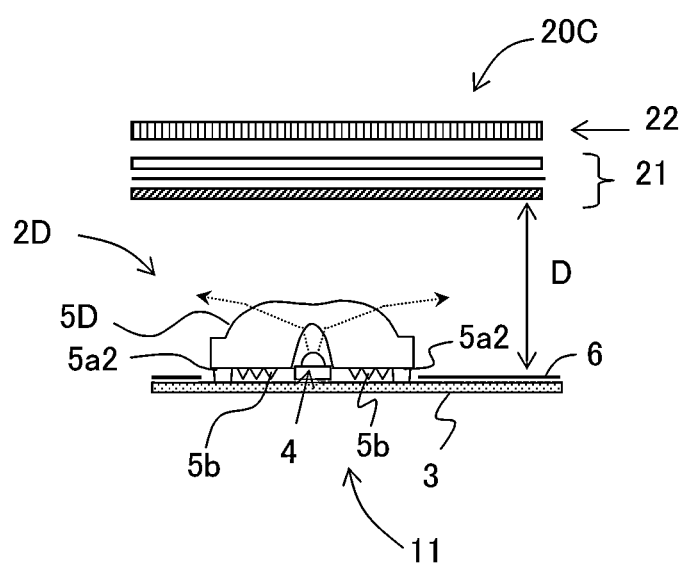
FIG. 9 is a partial longitudinal cross sectional view schematically showing a configuration example of an essential part of a liquid crystal display apparatus, for describing a light source section with a broad light distribution angle.

FIG. 7 is a partial longitudinal cross sectional view schematically showing a configuration example of an essential part of a liquid crystal display apparatus having an LED light source apparatus according to Embodiment 2 of the present invention incorporated therein, and is also a figure indicating brightness according to positions corresponding to the subject cross-section. FIG. 8 is a partial longitudinal cross sectional view schematically showing a configuration example of an essential part of a liquid crystal display apparatus, for describing a light source section with a narrow light distribution angle. FIG. 9 is a partial longitudinal cross sectional view schematically showing a configuration example of an essential part of a liquid crystal display apparatus, for describing a light source section with a broad light distribution angle. In FIGS. 7 to 9, the same reference numerals are used for the structural members that indicate the same functional effects as those of the structural members in FIG. 2.

In FIG. 7 to FIG. 9, in an LED light source apparatus 11 used as a backlight in a liquid crystal display apparatus 20C according to Embodiment 2, an LED 4 as a light emitting element and a light diffusing lens 5 covering the LED 4 are used as the above-mentioned light source section, and the light source section with a narrow light distribution angle (light directivity) and the light source section with a broad light distribution angle (light directivity) are formed by the difference in length of a plurality of (three, herein) principal pillars 5a1 of a light diffusing lens 5C of FIG. 8, and a plurality (three, herein) of principal pillars 5a2 of a light diffusing lens 5D of FIG. 9. The length of the legs of the plurality of (three, herein) principal pillars 5a1 of a light diffusing lens 5C of FIG. 8 is different from the length of the legs of the plurality (three, herein) of principal pillars 5a2 of a light diffusing lens 5D of FIG. 9. Thus, compared to the case of the light diffusing lens 5D of FIG. 9, a light emitting section of the LED 4 is located lower than the lower surface recess of the light diffusing lens 5C. As a result, the brightness distribution thereof is such that the light distribution angle (light directivity) is narrow. Specifically, the light distribution angle (light directivity) is narrow by the light diffusing lens 5C with long legs of FIG. 8 and the light distribution angle (light directivity) is broad by the light diffusing lens 5D with long legs of FIG. 9. Since the total amount of light from the LED 4 is the same, the brightness peak from the light diffusing lens 5D with short legs of FIG. 9 is lower than the brightness peak from the light diffusing lens 5C with long legs of FIG. 8, by the difference in the light distribution angle (light directivity) broadened by the light diffusing lens 5D.

In Embodiment 2, an LED module 2C as a light emitting element module having one or a plurality of light source sections with a narrow light distribution angle (light directivity) and an LED module 2D as a light emitting element module having one or a plurality of light source sections with a light distribution angle (light directivity) broader than that of the LED module 2C, are alternately arranged in units of substrate section so that the unevenness in brightness of the two LED modules are compensated with each other to relieve the unevenness in brightness of the two. The light source section comprises an LED 4 and a light diffusing lens 5C or 5D, and the light source section with a narrow light distribution angle (light directivity and the light source section with a broad light distribution angle (light directivity) are formed by the difference in length of the legs (principal pillars 5a1, 5a2) of the light diffusing lens 5C or 5D.

From the foregoing, according to Embodiment 2, an LED module 2C having one or a plurality of light source sections with a narrow light distribution angle (light directivity) and an light emitting element module 2D having one or a plurality of light source sections with a broad light distribution angle (light directivity) are alternately arranged. Thus, a light source section having large light emission brightness on an optical axis passing through a light emitting element and small light emission brightness in a peripheral part away from the optical axis, is combined with a light source section having small light emission brightness on the optical axis passing through the light emitting element than the light emission brightness on the optical axis at the first light source section, and having large light emission brightness in a peripheral part away from the optical axis than light emission brightness at the peripheral part away from the optical axis of the first light source section, thereby relieving the decrease in emission brightness between the light source sections. As a result, the difference in brightness is relieved immediately above the light source section and between the light source sections. Thereby, it becomes possible to control the brightness unevenness of the plane light source visible to human eyes and increase a display quality of the plane light source. In addition, since the difference in brightness is relieved immediately above the light source section and between the light source sections and the unevenness in brightness is controlled on a screen, a pitch between the LEDs 4 can be widened, and as a result, the number of light source sections, including the LED 4, are reduced.

In Embodiment 2, the case has been described where an LED module 2C having one or a plurality of light source sections with a narrow light distribution angle (light directivity) and an LED module 2D having one or a plurality of light source sections with a broad light distribution angle (light directivity) are alternately arranged; however, without being limited to this embodiment, a light source section with a narrow light distribution angle (light directivity) and a light source section with a broad light distribution angle (light directivity) may be alternately arranged for each light emitting element module 2. Even if those plurality of light source sections are arranged in a matrix in a plane view, a working effect is exerted which controls the unevenness of brightness of a plane light source and improves the display quality of the plane light source, similar to the case where an LED module 2C having one or a plurality of light source sections with a narrow light distribution angle (light directivity) and an LED module 2D having one or a plurality of light source sections with a broad light distribution angle (light directivity) are alternately arranged.

In sum, in the case where a plurality of light source sections are arranged in a matrix in row and column directions, it is sufficient to arrange a light source section with a narrow light distribution angle (light directivity) and a light source section with a broad light distribution angle (light directivity) alternately for each row or each column.

In Embodiment 2, the light source section with a narrow light distribution angle (light directivity) and the light source section with a broad light distribution angle (light directivity) are achieved by the difference in the length of the legs of the plurality of principal pillars 5a of the light diffusing lens 5. However, without being limited to this embodiment, the light source section with a narrow light distribution angle and the light source section with a broad light distribution angle may be formed by the difference in at least either of the thickness or shape of the light diffusing lens 5, separately from the length of the legs of the plurality of principal pillars 5a of the light diffusing lens 5, or together with the length of the legs of the plurality of principal pillars 5a of the light diffusing lens 5.

In addition, while the light source section with a narrow light distribution angle (light directivity) and the light source section with a broad light distribution angle (light directivity) are achieved by the difference in the length of the legs of the plurality of principal pillars 5a of the light diffusing lens 5, without being limited to this embodiment, the light source section with a narrow light distribution angle (light directivity) and the light source section with a broad light distribution angle (light directivity) may be formed by the difference in the height of one or a plurality of light source sections within the LED 4 functioning as a light emitting element.

Figure 10:
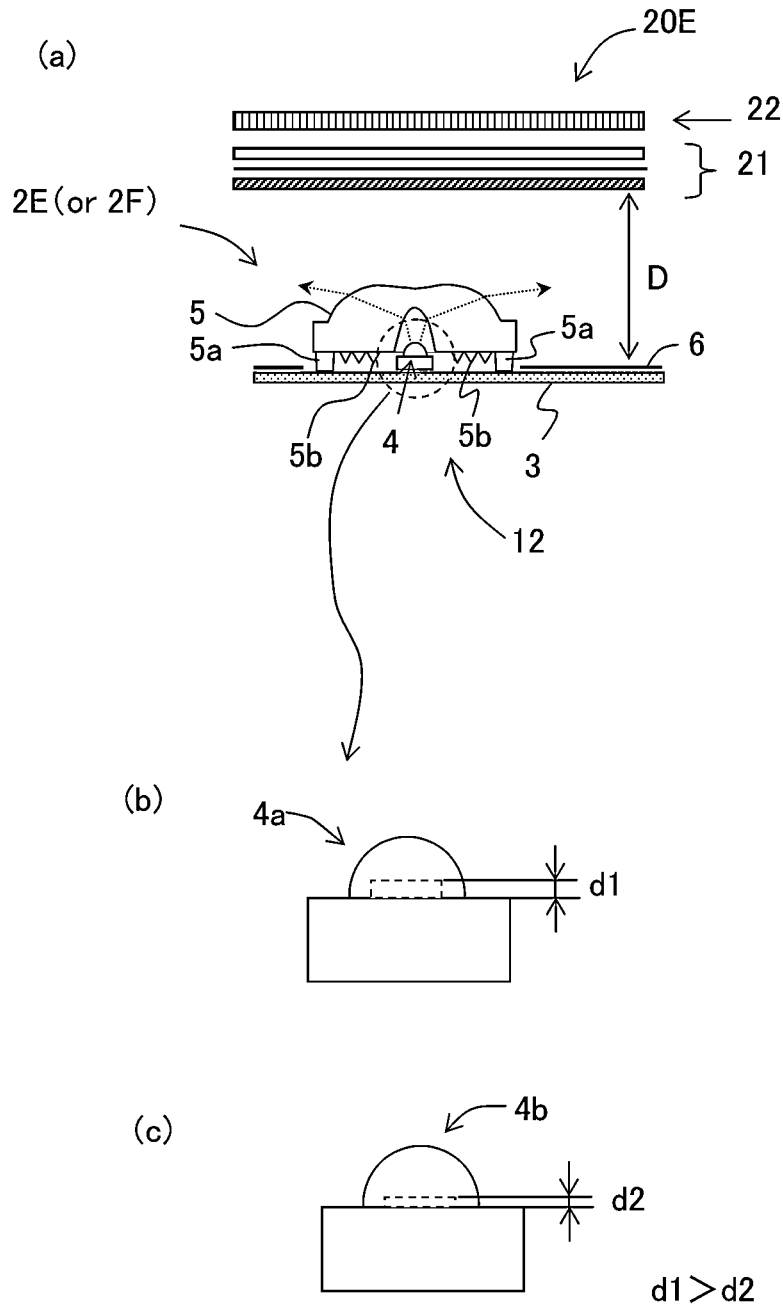
FIG. 10(a) is a partial longitudinal cross sectional view of a liquid crystal display apparatus having a variation of an LED light source apparatus according to Embodiment 2 of the present invention incorporated therein.
FIG. 10(b) is side view of an LED in the case of a height d1 of a light emitting section within the LED.
FIG. 10(c) is a side view of an LED in the case of a height d2 of a light emitting section which is lower than a height d1 of the light emitting section in FIG. 10(b).
Figure 11:
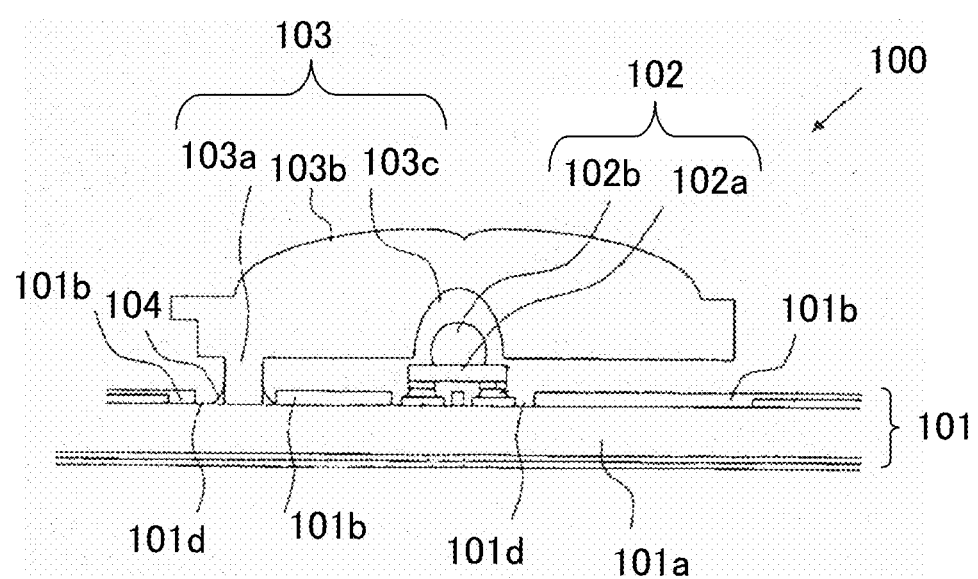
FIG. 11 is a longitudinal cross sectional view showing a configuration example of an essential part of a conventional light emitting element module having a light emitting element disclosed in Patent Document 1 mounted thereon.
Figure 12:
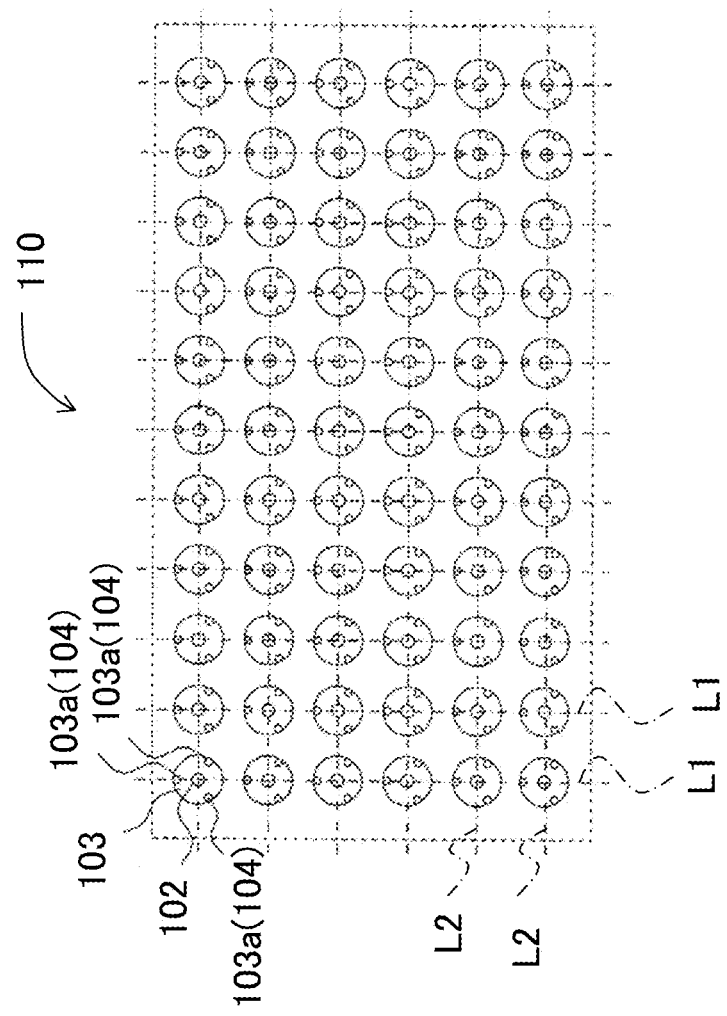
FIG. 12 is a plane view showing an arrangement example of optical lenses in a plane light emitting unit having a plurality of light emitting element modules of FIG. 11 mounted thereon.

A height d1 of one or a plurality of light emitting sections in the LED 4a is higher, for example as shown in FIG. 10(b), than a height d2 of one or a plurality of light emitting sections in LED 4b, for example, as shown in FIG. 10(c). Accordingly, the light emitting sections in the LED 4a get closer to the light diffusing lens 5 compared to the light emitting sections in the LED 4b. As a result, a similar effect is achieved as the case of shortening the length of the legs of the plurality of principal pillars 5a of the light diffusing lens 5 to achieve the light source section with a broad light distribution angle (light directivity) in Embodiment 2. In sum, the LED 4a shown in FIG. 10(b) can be used to form a light source section with a broad light distribution angle (light directivity); and the LED 4b shown in FIG. 10(c) can be used to form a light source section with a narrow light distribution angle (light directivity).

Therefore, as Embodiment 2, an LED module 2E as a light emitting element module having one or a plurality of light source sections in which a light distribution angle (light directivity) is set to be broad by the LED 4a with a high light emitting section, and an LED module 2F as a light emitting element module having one or a plurality of light source sections in which a light distribution angle (light directivity) is set to be narrow by the LED 4b with a low light emitting section, are alternately arranged in units of substrate section, so that different types of unevenness in brightness of the LED modules are compensated with each other to relieve the unevenness in brightness of the LED modules. Thereby, the purpose of the present invention, to control unevenness in brightness of the plane light source to increase display quality of the plane light source, is achieved. Instead, the purpose of the present invention may also be achieved by alternately arranging a light source section with a narrow light distribution angle (light directivity) by the LED 4b, 4a and a light source section with a broad light distribution angle (light directivity) for each light emitting element module 2.

Furthermore, as previously described, besides the case where the light source section with a narrow light distribution angle (light directivity) and the light source section with a broad light distribution angle (light directivity) are formed by the difference in the height of one or a plurality of light emitting sections in the LED 4 as a light emitting element, the light source sections may have LEDs 4 and the light source section with a narrow light distribution angle and a light source section with a broad light distribution angle may be formed by the difference in the shape of resin sealing sections through which light from the LED 4 is emitted. Dome-shaped sealing sections through which light from the LED 4 is emitted are filled with a fluorescent substance for changing a blue color light into a white color light, and the sealing sections also function as a lens section for narrowing down and emitting light in a predetermined direction.

In Embodiments 1 and 2, the case of Embodiment 1 has been described where a light source section with a high brightness peak value and a large light and dark contrast difference, and a light source section with a low brightness peak value and a small light and dark contrast difference, are alternately arranged, using the difference in reflection rates of white resists 6A, 6B or reflection sheets, are alternately arranged; and separately the case of Embodiment 2 has been described where a light source section with a narrow light distribution angle (light directivity) and a light source section with a broad light distribution angle (light directivity) are alternately arranged with light diffusing lenses 5C, 5D. However, the objective of the present invention, to control the brightness unevenness of the plane light source and increase a display quality of the plane light source, may be achieved by combining Embodiments 1 and 2. In Embodiment 2, the light source section with a narrow light distribution angle (light directivity) and the light source section with a broad light distribution angle (light directivity) are achieved by forming the principal pillars 5a1 of the light diffusing lens 5C longer than the principal pillars 5a2 of the light diffusing lens 5D. However, without being limited to this embodiment, the light source section with a narrow light distribution angle (light directivity) and the light source section with a broad light distribution angle (light directivity) may be achieved by the difference in the thickness or shape of the light diffusing lens. Furthermore, in the case of combining Embodiments 1 and 2, a similar effect in the case of changing the length of the legs of the principal pillars 5a of the light diffusing lens 5 may also be obtained, for example, in the case of fixing the principal pillars 5a of the light diffusing lens 5 on the white resists 6A, 6B and reflection sheets of different reflection rates, and in the case of fixing the principal pillars 5a of the light diffusing lens 5 on a substrate region where white resists 6A, 6B and reflection sheets of different reflection rates are not provided. As a matter of course, similar to the case of changing the length of the legs of the principal pillars 5a of the light diffusing lens 5 as in the case of Embodiment 2, the effect of the present invention may be obtained even in the case of mounting light diffusing lenses 5 on white resists and reflection sheets of the same reflection rate as well as the substrate region without any white resists or reflection sheets.

While Embodiments 1 and 2 have described the LED light source apparatus 1, 11, and 12 using the LED 4 as a light emitting element, the light emitting element may be a combination of a laser element and a fluorescent substance.

As such, the present invention has been exemplified by using the preferable Embodiments 1 and 2 of the present invention; however, the present invention should not be interpreted only based on the Embodiments 1 and 2. It is understood that the scope of the present invention should be interpreted solely based on the claims. It is also understood that those skilled in the art can implement equivalent scope of technology, based on the description of the present invention, from the description of the detailed preferred Embodiments 1 and 2 of the present invention. Furthermore, it is understood that any patent, any patent application and any references cited in the present specification would be incorporated by reference in the present specification in the same manner as the contents are specifically described therein.

INDUSTRIAL APPLICABILITY

In the field of a light source apparatus, in which a plurality of LED modules and the like equipped with a plurality of light emitting diodes (LED) as a light source, are used and a liquid crystal display apparatus in which the light source apparatus is used as a back light, according to the present invention, a light source section having large light emission brightness on an optical axis passing through a light emitting element and small light emission brightness in a peripheral part away from the optical axis, is combined with a light source section having small light emission brightness on the optical axis passing through the light emitting element than the light emission brightness on the optical axis at the first light source section, and having large light emission brightness in a peripheral part away from the optical axis than light emission brightness at the peripheral part away from the optical axis of the first light source section, thereby relieving the decrease in emission brightness between the light source sections. As a result, the difference in brightness is relieved immediately above the light source section and between the light source sections, and it becomes possible to control unevenness in brightness on a screen visually sensed by humans. As a result, it becomes possible to increase a display quality of the plane light source. As such, since the difference in brightness is relieved immediately above the light source section and between the light source sections and the unevenness in brightness is controlled on a screen, the pitch between the light emitting elements can be widened, and as a result, the numbers of light source sections can be reduced.

The invention claimed is:

1. A light source apparatus, comprising a plurality of light emitting element modules provided therein, in which a plurality of light source sections each comprising a light emitting element are mounted on a substrate, for all of the plurality of light source sections simultaneously emitting light planarly,
the plurality of light source sections comprising a light source section with a narrow light distribution property having a brightness peak that is high and a light source section with a broad light distribution property having the brightness peak that is low, wherein when a plurality of the light source sections are arranged in a matrix in a row direction and a column direction in a plane view, the light source section with a narrow light distribution property having a brightness peak that is high and the light source section with a broad light distribution property having the brightness peak that is low are being alternately arranged for only each row or only each column, wherein
the light source section comprises a reflecting material provided on a substrate region around the light emitting element, in addition to the light emitting element, and
the light source section with high contrast and the light source section with low contrast are formed by the difference in a reflection rate of the reflecting material.

2. A light source apparatus according to claim 1, wherein the light source section with the narrow light distribution property is a light source section with a high contrast, and the light source section with the broad light distribution property is a light source section with a low contrast.

3. A light source apparatus according to claim 2, wherein the light emitting element module comprising the plurality of light source sections with the high contrast, and the light emitting element module comprising the plurality of light source sections with the low contrast are alternately arranged.

4. A light source apparatus according to claim 2, wherein the light source section with the high contrast and the light source section with the low contrast are alternately arranged in each of the plurality of light emitting element modules.

5. A light source apparatus according to claim 1, wherein a lens is mounted for each light emitting element, and the substrate region around the light emitting element is a substrate region immediately below the lens.

6. A light source apparatus according to claim 1, wherein the light source section with the narrow light distribution property is a light source section with a narrow light distribution angle, and the light source section with the broad light distribution property is a light source section with a broad light distribution angle.

7. A light source apparatus according to claim 6, wherein the light emitting element module comprising the plurality of light source sections with the narrow light distribution angle, and the light emitting element module comprising the plurality of light source sections with the broad light distribution angle are alternately arranged.

8. A light source apparatus according to claim 6, wherein the light source section with the narrow light distribution angle and the light source section with the broad light distribution angle are alternately arranged in each of the plurality of light emitting element modules.

9. A light source apparatus according to claim 6, wherein:
the light source section comprises the light emitting element and the lens mounted for each light emitting element; and
the light source section with the narrow light distribution angle and the light source section with the broad light distribution angle are formed by the difference in at least any of a length of a plurality of principal pillars of the lens, a thickness of the lens and a shape of the lens.

10. A light source apparatus according to claim 6, wherein:
the light source section comprises the light emitting element; and
the light source section with the narrow light distribution angle and the light source section with the broad light distribution angle are formed by the difference in a height of light emitting sections of the light emitting element.

11. A light source apparatus according to claim 6, wherein:
the light source section comprises the light emitting element; and
the light source section with the narrow light distribution angle and the light source section with the broad light distribution angle are formed by the difference in a shape of a sealing section through which light from the light emitting element is emitted.

12. A light source apparatus according to claim 1, wherein: a light diffusing means is arranged on an upper part of a plurality of light emitting elements arranged two dimensionally; light from the plurality light emitting elements is transmitted through the light diffusing means; and the light from the plurality of light emitting elements is further spread planarly by an effect of diffusion, multiple reflection and retroreflection of light by the light diffusing means; and plane light emission with a flat brightness characteristic is obtained by overlapping a spread pattern of the obtained light.

13. A liquid crystal display apparatus comprising the light source apparatus according to claim 1, provided on a back surface side of a liquid crystal panel, to be used as a backlight.

* * * * *